Oct. 25, 1932.  F. B. MILLINGTON  1,884,804
SPEED CONTROL FOR AUTOMOBILES
Filed Sept. 5, 1930
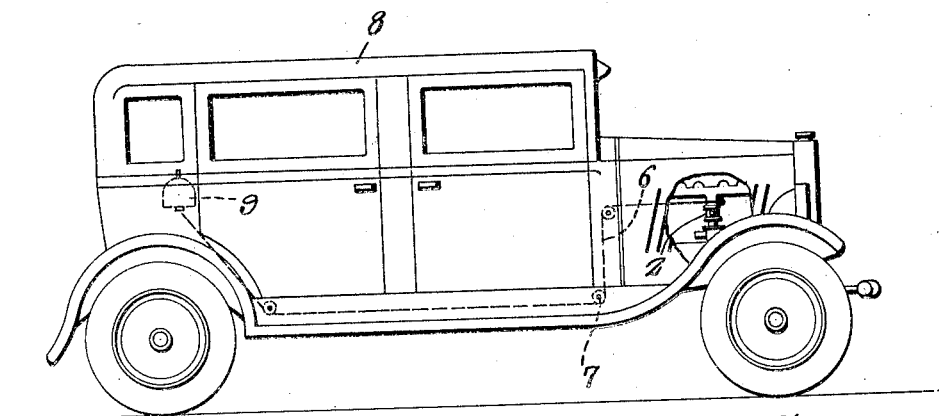
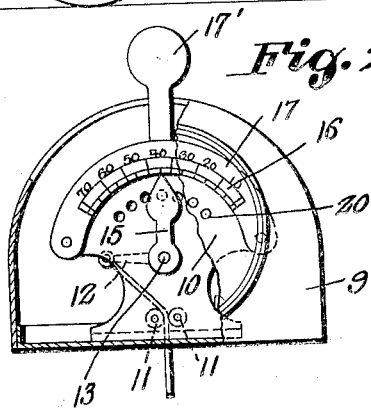
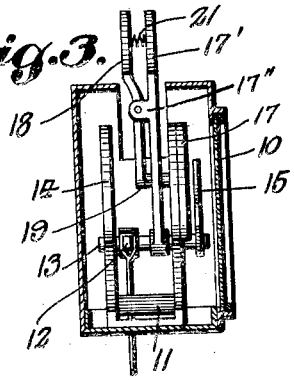
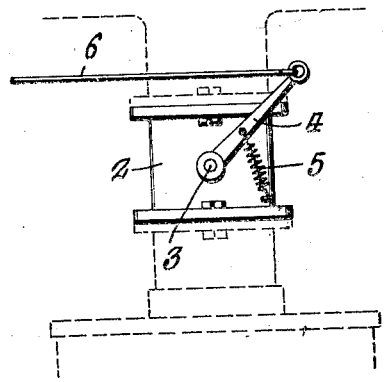
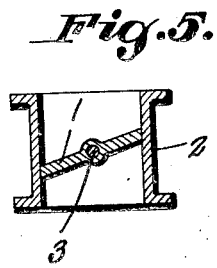
F. B. Millington,
INVENTOR
BY Victor J. Evans
ATTORNEY Patented Oct. 25, 1932

1,884,804

UNITED STATES PATENT OFFICE

FELIX BERESFORD MILLINGTON, OF MARACAIBO, VENEZUELA

SPEED CONTROL FOR AUTOMOBILES

Application filed September 5, 1930. Serial No. 480,013.

This invention has reference to automobiles, and my object is the provision of means whereby the speed of the engine of an automobile may be controlled by the owner or occupant of the back seat of the machine, whereby the owner or occupant can insure comfort in riding as well as safety, inasmuch as the supply of fuel to the engine cylinders may be entirely cut off if desired.

A further object is the provision of an engine control for automobiles operated by the driver or occupant of a rear seat of the machine which not only insures the comfortable riding of the owner or occupant at the desired rate of speed, but serves as a safety device inasmuch as the supply to the motor may be entirely cut off, and further insures safety in riding inasmuch as the chauffeur or driver need only tend to the guiding of the machine and the necessary shifting of the gears.

Another advantage of my improvement resides in the fact that the operating means for the control being arranged in the rear of the machine and convenient to the occupant or owner can cause the engine to speed up when traveling along robber infested places or to slow down should it be found necessary to escape robbers or bandits.

In the drawing:

Figure 1 is a side elevation of an automobile equipped with the improvement.

Figure 2 is a plan view of the hand operated mechanism of the control.

Figure 3 is an approximately central transverse sectional view therethrough.

Figure 4 is an elevation illustrating the arrangement of the butterfly governor or fuel control valve between the carbureter and the intake manifold of the engine.

Figure 5 is a sectional view on the line 5—5 of Figure 4.

At any desired place above the carbureter of an internal combustion engine for automobiles I arrange a governor butterfly valve 1. The valve is preferably journaled in a cylindrical casting 2 which is bolted to the fuel intake pipe of the engine. The shaft 3 for the control valve 1 has fixed on one of its ends a lever 4. This lever is influenced by a spring 5 to normally close the valve 1.

To the outer end of the lever I connect a strong flexible element such as a wire or cord 6. The element 6 is trained around suitable grooved guide wheels 7 to direct the element 6 to the rear of the automobile 8.

Positioned at a convenient place with respect to the occupant of the rear seat of the automobile there is the hand operated control mechanism of the improvement. This mechanism includes a casing 9 that has one of its faces provided with a cylindrical opening closed by a transparent plate 10. The element 6 is received through the bottom of the casing and is guided between oppositely disposed wheels 11 respectively. The flexible element 6 has its end connected to an arm 12 which is fixed on a shaft 13 that is journaled in suitable upright bearings 14 in the casing 9. The shaft on one of its ends carries a hand 15, and this hand is designed to travel over graduated marks 16 on a dial plate 17 that is visible through the transparent window 10 of the casing.

There is fixed on the shaft 13 an operating lever 17' that extends through a suitable opening in the top of the casing 1. Pivotally secured between spaced ears 17'' on the rear of the operating lever 17' there is a handle 18. The handle has its inner end offset, as at 19, and this offset or finger end 19 is designed to be received in any one of a series of arcuately arranged equidistantly spaced apertures 20 on the support for the dial plate 17. The handle 18 is normally influenced away from the lever by a spring 21 and this spring, of course, causes the finger 19 to enter any one of the apertures 20. The dial plate 17 has inscribed thereon the graduations indicating the speed at which the engine travels. It will be readily apparent that by pressing the handle 18 toward the lever 17' to bring the finger 19 out of any one of the apertures 20 (which apertures are arranged in a line with the several graduations on the dial plate 17), that the occupant of the rear seat of the automobile can operate the governor butterfly valve 1 to cause the desired quantity of fuel to enter the manifold and the several cylinders of the engine and thereby control the speed of the engine without necessitating the occupant of the back seat directing the chauffeur or in anyways distracting his attention from his driving duties.

Suitable means may be provided for preventing the operation of the device after the same has been set to open the valve 1, and likewise the hand operating device may be arranged in a suitable pocket in the side of the automobile and such pocket may be closed and locked when the owner of the machine does not occupy the automobile.

It is believed the foregoing description when read in connection with the accompanying drawing will clearly set forth the construction and manifest advantages so that further description will not be required but obviously I do not wish to be restricted to the precise details herein set forth and, therefore, hold myself entitled to make such changes therefrom as fairly fall within the scope of what I claim.

Having described the invention, I claim:—

A control for a valve which is normally spring influenced to closed position, comprising a casing located a distance from the valve and having a rounded top which is slotted, and having a transparent face, a pair of spaced upright plates in the casing disposed respectively at the sides of the opening, the plate, adjacent to the transparent face of the casing, having its outer portion widened and its upper end arched, a graduated dial plate fixed on the said upper portion of the plate and said plate, below the dial plate having an arcuate series of spaced apertures therethrough, a shaft journaled through both of the plates and having a dial hand on one end thereof for travel over the dial plate, a lever fixed on the shaft and extending through the opening in the casing, a handle pivotally secured to the lever, spring influenced away from the outer end thereof and having an offset end to be received in any one of the series of apertures, an arm having one end fixed on the shaft, a pair of closely related rollers journaled between the plates and a flexible element fixed to the arm, guided between the rollers and connected to the operating handle for the valve.

In testimony whereof I affix my signature.

FELIX BERESFORD MILLINGTON.